(12) United States Patent  
Tchugunov (10) Patent No.: US 6,835,299 B1  
(45) Date of Patent: Dec. 28, 2004

(54) ELECTROCHEMICAL MACHINING METHOD AND APPARATUS

(75) Inventor: Boris Tchugunov, Moscow (RU)

(73) Assignee: Ultra Systems Limited, London (GB)

( * ) Notice: Subject to any disclaimer, the term of this patent is extended or adjusted under 35 U.S.C. 154(b) by 0 days.

(21) Appl. No.: 10/111,141

(22) PCT Filed: Oct. 20, 2000

(86) PCT No.: PCT/GB00/04033

§ 371 (c)(1),  
(2), (4) Date: Sep. 3, 2002

(87) PCT Pub. No.: WO01/30526

PCT Pub. Date: May 3, 2001

(30) Foreign Application Priority Data

Oct. 23, 1999 (GB) .............................................. 9925024

(51) Int. Cl.[7] .............................. C25F 3/00; C25F 7/00
(52) U.S. Cl. ....................... 205/654; 205/674; 205/686; 205/672; 204/222; 204/224 M; 204/225
(58) Field of Search ................................. 205/674, 686, 205/672, 652–654; 204/222, 224 M, 225

(56) References Cited

U.S. PATENT DOCUMENTS 3,271,283 A 9/1966 Clifford et al.
3,280,016 A 10/1966 Bass et al.
5,062,933 A 11/1991 Nakano ...................... 204/129
5,833,835 A * 11/1998 Gimaev et al. ............. 205/645
6,454,930 B1 * 9/2002 Derighetti ................... 205/645

FOREIGN PATENT DOCUMENTS

EP 0399129 11/1990

OTHER PUBLICATIONS

PCT International Preliminary Examination Report, PCT GB00/04033, Oct. 23, 1999, 9 pages.

* cited by examiner

Primary Examiner—Donald R. Valentine  
(74) Attorney, Agent, or Firm—Koppel, Jacobs, Patrick & Heyby; Michael J. Ram (57) ABSTRACT

An electrochemical machining technique involves moving a cathode (2) towards an anodic workpiece (1). A current is passed through an electrolyte which flows between the cathode (2) and workpiece (1) so as to cause material to be removed electrolytically from the workpiece (1). A vibratory movement is imposed on the cathode (2) and the current passed between the cathode (2) and workpiece (1) is also varied. The vibratory movement may consist of a main sinusoidal oscillation and a secondary ultrasonic vibration, and the current variation is synchronized with the main vibration so that current pulses, and ultrasonic vibration pulses, coincide, with a predetermined small phase shift, with peaks of the main vibration corresponding to the smallest gap between the cathode (2) and workpiece (1).

48 Claims, 4 Drawing Sheets

ELECTROCHEMICAL MACHINING METHOD AND APPARATUS

This application claims benefit of PCT/GB00/04033 filed 20 Oct. 2000 published as WO 01/30526 which claims benefit of GB 00/04033 filed 23 Oct. 1999.

This invention relates to electrochemical machining (ECM).

ECM is a known technique for machining metal workpieces. A cathode is advanced towards the anodic workpiece in the presence of an electrolyte and a current is passed between the cathode and the workpiece through the electrolyte so as to cause material to be removed electrolytically from the surface of the workpiece.

This technique can be used for the machining of irregularly shaped workpieces such as dies and moulds, as well as irregularly shaped holes in metals which do not readily yield to mechanical cutting. Also, three-dimensional patterns can be applied to workpiece surfaces derived from a correspondingly shaped cathode.

High currents are desirable to attain high rates of removal of material, and the smaller the gap between the cathode and the workpiece the sharper is the machining definition which can be achieved.

However, with high currents and small gaps there is the problem that debris and any operational irregularities can give rise to adverse effects such as surface roughness, poor accuracy and even damaging short circuits. In practice therefore it is necessary to limit the gap to, say, no smaller than 0.2 mm, and this imposes a limitation on the sharpness of definition which can be achieved.

An object of the present invention is to provide an ECM technique with which very small gaps can be used with high machining quality, accuracy and productivity.

According to one aspect of the invention therefore there is provided an ECM technique wherein a cathode is advanced towards an anodic workpiece in the presence of an electrolyte and a current is passed between the cathode and the workpiece through the electrolyte so as to cause material to be removed electrolytically from the surface of the material characterised in that vibratory movement is imposed on the cathode so as to cause the gap between the cathode and the workpiece to vary, and the current is also varied.

With this technique it has been found that the vibration of the cathode and the variation of the current can counter adverse effects of debris and operational irregularities whereby it is feasible to use much smaller gaps and consequently sharper machining definition can be achieved. Gaps down to say 0.01 mm or even 0.005 mm may be feasible, compared with conventionally used gaps down to say 0.2 mm.

The vibratory movement applied to the cathode may comprise a main vibration preferably a periodic oscillation particularly of a low frequency, say in the range 1 to 100 Hz, conveniently of the order of 50 Hz. This oscillation may be a sine wave oscillation of constant characteristics and preferably it is applied wholly or largely along the direction of advancement of the cathode towards the workpiece.

With regard to the current variation, this may be of any suitable nature but preferably occurs on a periodic basis, which may be matched to, and preferably occurs at the same frequency as, the main vibratory movement of the cathode such that current peaks or pulses are delivered at or close to positions in the oscillatory cycle of the cathode corresponding to the smallest gap or nearest positioning of the cathode and workpiece.

Most preferably, the current variation has a fixed phase relationship with the main vibratory movement of the cathode such that the current pulses or peaks coincide with, or lag or lead to a predetermined extent, the smallest gap positions in the main vibratory movement cycle.

By arranging for current pulses or peaks to coincide with or be close to positions of maximum convergence between the cathode and workpiece erosion efficiency can be promoted. By arranging for the current to decline, or be switched off, as the cathode moves away from the workpiece it can be achieved that current flow is commutated thereby minimising stray erosion, which is adverse to accuracy. The period during which the gap increases and current flow decreases or terminates gives an opportunity for debris and machined particles to be flushed away.

Additionally or alternatively, the vibratory movement applied to the cathode may comprise a secondary vibration preferably of a higher frequency than the main vibration, generally of the nature of an ultrasonic oscillation, particularly having a frequency in the range 10 to 60 KHz i.e. 10 to 40 KHz or 20 to 60 KHz. This oscillation may be a sine wave oscillation or of any other suitable wave form This higher frequency vibration can cause cavitation in the electrolyte between the cathode and the workpiece which dislodges debris and can allow operation with smaller gaps over larger areas without requiring unduly high current levels due to the blocking effect of bubbles. An even spread of electrolyte over the cathode and workplace surface can be facilitated. Also the cavitation can help remove metal oxide film and thereby facilitate activation of machining on oxidised metals.

Most preferably this secondary vibratory movement is applied to the cathode simultaneously with the aforesaid main vibratory movement.

Preferably also, the secondary vibration is applied wholly or largely along the direction of advancement of the cathode towards the workpiece.

The secondary vibratory movement of the cathode may occur continuously with constant, regular characteristics. Alternatively, the vibration, may be discontinuous, and/or may vary or be irregular with regard to frequency, amplitude, mark-space ratio or any other characteristic as desired. Thus, by way of example, the secondary vibration can be frequency and/or amplitude modulated and can be applied as individual pulses or as packages of pulses and may be locked to the variation (e.g. frequency) of the electric current and/or to the frequency of the main vibration.

In a preferred embodiment the secondary vibration movement is tuned in relation to the cathode's mechanical properties to give resonance.

A control system is preferably provided to effect automatic control of machining parameters, and conveniently this system may be computerised.

Thus the control system may control advancement of the cathode as material is removed from the workpiece surface so as to maintain a desired cathode/workpiece gap. This may be achieved by monitoring current and/or voltage characteristics across the gap. Additionally or alternatively other indications may be utilised such as optical or acoustic monitoring of the gap. In the latter respect, where ultrasonic secondary vibratory movement is applied to the cathode as mentioned above this can result in the generation of an acoustic signal dependent on the magnitude of the gap and this can be monitored with a transducer.

The control system may also control advancement in relation to a determined starting reference position so as to achieve a desired depth of machining in the workpiece. This reference position may be established by determining the position of the cathode when the workpiece is contacted by the cathode, preferably at a bottom-dead-centre position of vibratory movement of the cathode.

The control system may operate to control advancement of the cathode so as to maintain constant parameters for the gap. Alternatively however the control system may operate to vary the gap depending on factors such as detected variations in machining conditions, or the stage in the machining process e.g. such that initial machining takes place with a larger gap and final precision finishing takes place with a smaller gap.

Alternatively or additionally the control system may control voltage and/or current across the cathode/workpiece gap so as to maintain a desired rate of machining, which may be a constant rate or a varying rate. In the latter case, the machining rate may be varied in dependence on machining conditions and/or stage in the machining process.

Provision may be made for pre-setting the control system in accordance with different requirements, relating for example to different materials, or different types or characteristics of shapes to be machined. Provision may also be made for pre-setting other parameters for this purpose, in particular, parameters of the main and/or secondary vibration and/or the current variation, as mentioned above.

The control system may also be utilised to monitor and maintain at a predetermined or pre-set value parameters relating to the supply of electrolyte, particularly the pressure of the electrolyte.

The electrolyte is preferably caused to flow between the cathode and workpiece e.g. by pumping from an inlet to an outlet through a vessel or shroud enclosing at least parts of the cathode and workpiece.

The electrolyte may be supplemented by an injected aqueous medium which may contain an acid or alkali and/or a salt solution and/or abrasive particles.

The invention also provides a machine for use in performing the method described above comprising a cathode support, a workpiece support, means for supplying electrolyte between the cathode and workpiece, means for supplying current to the cathode and the workpiece, means for advancing the cathode towards the workpiece, means for applying vibratory movement to the cathode to vary the gap between the cathode and the workpiece, and means for varying the current supplied to the cathode and the workpiece.

In addition the advancement and vibratory movement of the cathode, provision may also be made for other movements to facilitate machining of different or larger shapes. Thus, provision may be made for movement in one or more axes transversely to the direction of advancement and/or rotation of the cathode about the direction of advancement.

The invention will now be described further by way of example only and with reference to the accompanying drawings in which.

Figure 1:
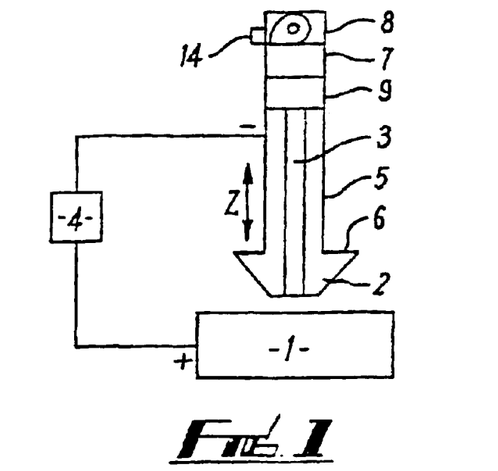
FIGS. 1 and 2 are diagrammatic sectional views of a cathode and an anodic workpiece in two relative positions in the performance of an ECM process in accordance with one embodiment of the invention.
Figure 2:
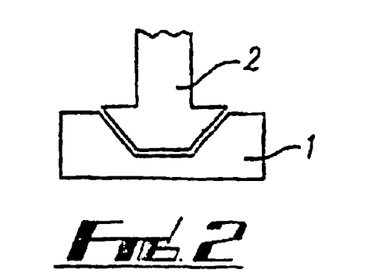

Referring to FIGS. 1 and 2, an ECM process for erosion of the surface of a metal workpiece is performed within the confines of a vessel or shroud (not shown) containing or enclosing the workpiece 1 and a shaped cathode 2.

The workpiece 1 is removably fixed in position on a work table and the cathode 2 is supported above the workpiece so as to be movable upwards and downwards along a vertical axis (Z). The cathode 2 is also movable in other directions (X, Y, R) as discussed below.

An electrolyte, namely a 5 to 10% aqueous solution of sodium chloride or sodium nitrate, is pumped through jets 3 between the cathode 2 and the workpiece 1 at a velocity of say 100 m/s.

A DC power supply 4 is connected to the cathode 2 and the workpiece 1, giving a negative potential at the cathode 2 and a positive potential at the workpiece 1, the potential difference being say 15–20 volts.

The cathode 2 has an upright stem structure 5 with a lower shaped head 6. The head 6 is shaped in correspondence with the desired shape to be machined in the workpiece 1.

The stem structure 5 is mounted for movement of the cathode 2 along the vertical axis Z and appropriate mechanisms 7, 8, 9 are provided for effecting controlled movement along the vertical axis Z in three modes, namely progressive advancement, vibratory movement up and down (oscillation) at a low frequency, and vibratory movement up and down (oscillation) at a higher frequency. Any suitable mechanisms may be used, for example, a screw drive 7 may be used for progressive advancement, a cam driven by a DC motor 8 may be used for low frequency oscillation, and an electromechanical device 9, such as a piezo crystal or electromagnetic coil or the like may be used for the higher frequency oscillation.

In addition, the cathode 2 is movable, by appropriate drive mechanisms (not shown) along two, mutually perpendicular horizontal axes X, Y, and also the cathode 2 is rotatable through a path R about its vertical axis Z. The cathode 2 can therefore be moved towards and away from the workpiece (along the Z axis), its lateral position can be adjusted (along the X and Y axes) and it can be rotated about a fixed location of the axis Z, or a movable location of the axis Z (orbitally).

Figure 3:
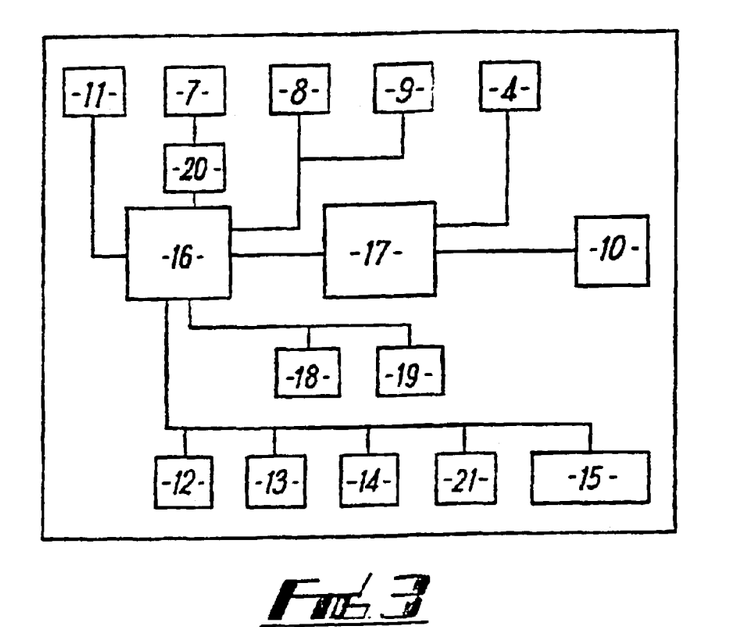
FIG. 3 is a schematic diagram of one form of a control system used in the performance of the process.

A computerised control system is provided (as shown in FIG. 3) and this is connected electrically to the cathode 2 and workpiece 1, a source of power 10, the various drive Mechanisms 7, 8, 9 for the cathode 2, a pump 11 for the electrolyte, and sensors, namely an electrolyte pressure sensor 12, a gap sensor 13 and a cathode bottom-dead-centre sensor 14.

The control system has input controls 15 whereby operational parameters can be adjusted and pre-set as discussed hereinafter.

The control system incorporates microprocessor logic boards 16, a power supply 17 connected to the source of power 10 and which produces power outputs for supply to the various powered components, and pulse and phase generator devices 18, 19.

In use, operation is as follows:

In a set up mode, the motor 8 is operated to cause the cam to rotate to bottom-dead-centre, i.e. the lowermost position of the cathode 2, as detected by the sensor 14. This sensor may comprise a magnetic switch operated by a steel projection on the cam, or it may comprise a different optical or mechanical device.

In this bottom-dead-centre position a set up voltage is applied between the cathode and the workpiece and this is monitored as the cathode 2 is advanced towards the workpiece 1. As soon as the measured potential difference between the cathode 2 and the workpiece 1 collapses indicating electrical contact, the advance is arrested and the bottom position of the cathode 2 is recorded as a reference position of the workpiece.

The system is then set in an operational mode and the cathode 2 is raised above the workpiece reference position to define a predetermined or pre-selected gap between the cathode 2 and the workpiece 1.

The bottom-dead-centre position is also recorded as a pulse reference position which is utilised by the phase generator 19 and pulse generator 18. That is, when the cam is at bottom-dead-centre a pulse is generated from the sensor 14 which is used by the phase generator 19 to initiate various operations, as discussed below, which are thereby locked in phase with the low frequency oscillating positioning of the cathode 2.

The cam is of variable lift (amplitude) and the drive motor 8 can be adjusted to vary the drive speed of the cam and hence the frequency of oscillation of the cathode 2. These parameters are pre-adjusted to values which are maintained constant throughout a particular machining process. The frequency of oscillation of the cathode 2 will be typically about 50 Hz and, being driven by the rotating cam, will be of sine wave form.

During the normal operation mode, the electrolyte is pumped under pressure between the cathode 2 and workpiece 1 and the pump 11 is controlled, in relation to the pressure detected with the sensor 12, to maintain a constant pressure at a pre-selected value. If desired air can also be pumped into the electrolyte at the same pressure and this increases the machine's ability to work on larger surface areas.

The DC current from the power supply 14 fed to the cathode 2 and the workpiece 1 varies sinusoidally. That is, a pulse of current, or more preferably a package or short train of pulses having a high frequency of interruption, is generated with the shape of the positive half of a sine wave, and this is synchronised with the bottom-dead-centre position of the cathode 2, as determined by the phase generator 19. The synchronism may be such that the pulse is precisely in phase with the bottom-dead-centre position although alternatively it may lag or lead slightly this position (a negative or positive phase value which can be pre-set as desired).

In addition to the low frequency oscillation, the cathode 2 is subjected to the higher frequency oscillation at a supersonic frequency (ultrasonic), say in the range 20 to 60 KHz. The actual frequency depends on the length of the cathode 2 and is preferably tuned to obtain optimum resonance.

The ultrasonic vibration may be applied as a continuous vibration or for intermittent periods in-phase with the main low frequency vibration of the cathode 2.

The magnitude of the impulse current applied is monitored and automatically controlled by measuring the voltage between the cathode 2 and the workpiece 1. A voltage is pre-computed in accordance with conditions and requirements and the impedance of the power supply 4 is adjusted so as to achieve the required voltage and consequently the machining current. Higher machining currents give higher rates of machining.

The impedance between the cathode 2 and the workpiece 1 can change during machining e.g. due to change in workpiece surface area, and the power supply impedance is automatically adjusted to compensate for this and thereby maintain the voltage constant.

The cathode 2 is advanced towards the workpiece 1 and this may be set for progression at a constant velocity equal to the mean speed of anodic dissolution over a period, with servocontrol. The servocontrol is determined by monitoring the rising and falling edges of the current pulses to assess the machining conditions. If the machining conditions are good and material is being removed readily from the workpiece, a control pulse is transmitted to a servo amplifier 20 such as to cause the cathode 2 to advance. If machining conditions are unsuitable for further progression no pulse is given to the servo amplifier 20 and the cathode 2 is not advanced.

The duration or extent of machining is determined in relation to the known reference starting position of the workpiece determined as mentioned above, and the desired depth of machining.

In the event that the cathode 2 approaches the workpiece 1 too closely at any point to the extent that there is a risk of contact this will initially be detected by contact between the cathode 2 and workplace 1 occurring for a very short period of time due to the movement of the cathode 2 at ultrasonic frequency imposed on the low frequency vibration and advancement of the cathode. Any such contact causes a momentary short circuit which triggers a short circuit monitoring device 21 which automatically takes appropriate remedial action such as lifting of the cathode 2 and/or disconnection of power. The extremely short duration of the short circuit limits the possibility of damage.

The normal working gap between the cathode 2 and the workpiece 1 i.e. the gap at the bottom-dead-centre position is preselected in accordance with requirements and is pre-set in relation to the above mentioned initial bottom reference position, and is then maintained by control of the advancement of the cathode by monitoring the voltage drop (particularly a high-frequency component of voltage drop) and/or current characteristics across the gap and/or by measuring the actual size of the gap using the gap sensor 13. An acoustic sensor responsive to an acoustic signal generated within the gap by the ultrasonic vibration can be used.

The gap requirement can be pre-set and varied as desired. A larger gap may be appropriate in some cases whereas a very small gap may be desirable in the case where sharp machining of fine detail is required.

With the procedure described above an operator can vary and preselect different parameters to meet the requirements of a particular application and this can be done by accessing data in a stored database. Provision may be made for accessing the database during machining so that parameters can be changed during erosion. This allows for high stock removal at the start of a cycle and a high quality surface finish at the end of a cycle. The change in machining parameters can be programmed then implemented automatically.

The axes of movement of the cathode 2 may be in closed loop control at all times, their position being fed back by optical encoders. The average feed rate and therefore machining rate can be monitored so that a statistical analysis of progress can be made and a strategy can be implemented to optimise the machining parameters.

The foregoing description is concerned with movement along the 'Z' axis i.e. along the vertical axis of the cathode 2. Movement is also possible about the mutually perpendicular X and Y axes in a horizontal plane, as well as rotation of the cathode, appropriate drives being provided for this. Rotation of the cathode facilitates machining of circular holes; X, Y translational movement permits machining of large areas; and simultaneous rotational and translational movement gives the capability of orbital movement to give accurate profiles and parallel sides within cavities, and simple shaped cathodes can be used to manufacture complicated shaped cavities.

FIGS. 4 to 9 show typical waveforms for different modes of operation.

Figure 4:
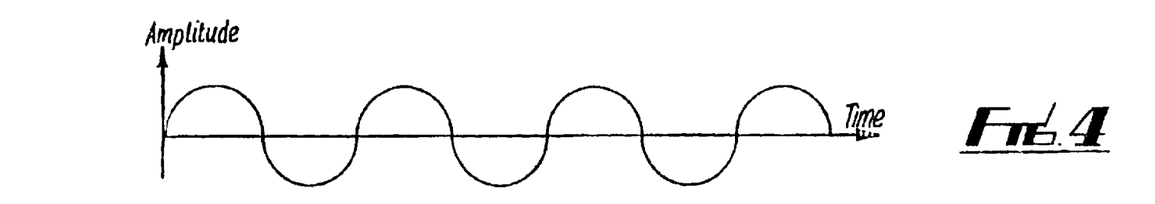
FIGS. 4-9 are waveforms illustrating different parameters of the process for different modes of operation.

FIG. 4 shows the waveform for low frequency oscillation of the cathode (typically approximately 50 Hz).

Figure 5:
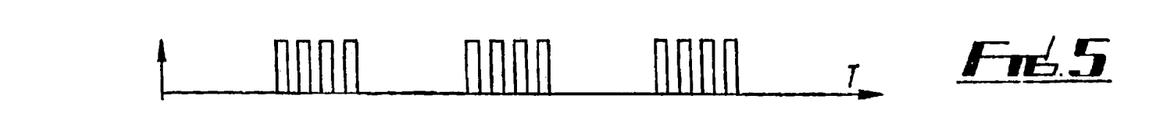

FIG. 5 shows packages of current pulses which packages are locked so as to coincide in frequency and phase with the low frequency oscillations.

FIGS. 6-9 show the high frequency (ultrasonic) vibration in relation to four different modes of operation.

Figure 6:
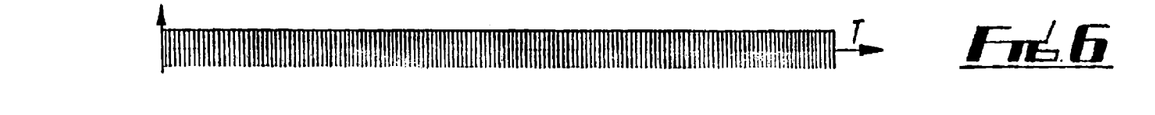

With FIG. 6 the high frequency vibration is continuous and of constant frequency and amplitude.

Figure 7:
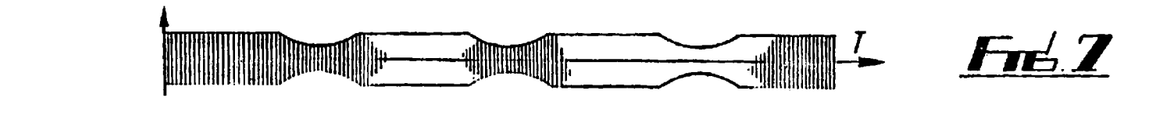

With FIG. 7 the high frequency vibration is continuous but is amplitude modulated at a low frequency which is phase-locked to the low frequency oscillation.

Figure 8:
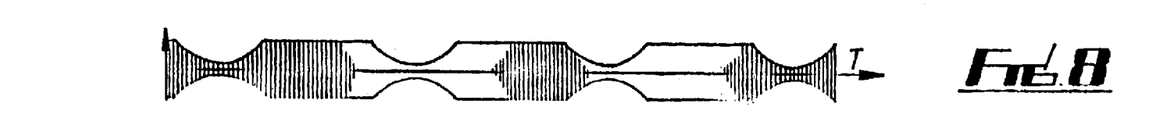

With FIG. 8 the ultrasonic oscillation is amplitude modulated at a low frequency which is phase-locked to the low frequency oscillation, with a different phase relationship to that of FIG. 7.

Figure 9:
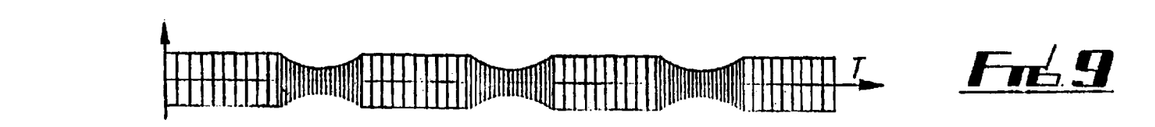

With FIG. 9 the ultrasonic oscillation is amplitude and frequency modulated with both forms of modulation phase-locked to the low frequency oscillations.

With the operating conditions of FIG. 6, the continuous, constant ultrasonic oscillations provide the following important functions:

give an acoustic signal when the predetermined minimum spacing between the electrodes is established;

ensure even spread of the electrolyte on the machined surface thus eliminating any macro-defects on the surface caused by jets of electrolyte;

form cavitation bubbles that partially block the surface of the cathode allowing machining of larger workpiece surfaces without increasing the capacity of the process current pulses;

in the case of readily passivating (oxidising) alloys, such as titanium alloys, activate the process of electrochemical dissolution due to cavitation which mechanically destroys oxide films as well as increase the current density due to a smaller minimum spacing between the electrodes.

With the operating conditions of FIG. 7 the decreased ultrasonic vibrations at the current pulses permit high current densities at small gaps, and the increase ultrasonic vibrations between current pulses facilitate flushing away of removed material.

The operating conditions of FIG. 8 are particularly suited for machining titanium alloys or steel since the increased ultrasonic vibration at the current pulse helps activate the process by removing oxide film.

The operating conditions of FIG. 9 are suited to the machining of large surfaces when high amplitude and frequency of ultrasonic vibrations are required.

Operating conditions other than those shown in FIGS. 6-9 can be used depending on requirements and conditions.

In particular FIGS. 10-14 show further typical waveforms for different modes of operation.

Figures 10, 11:
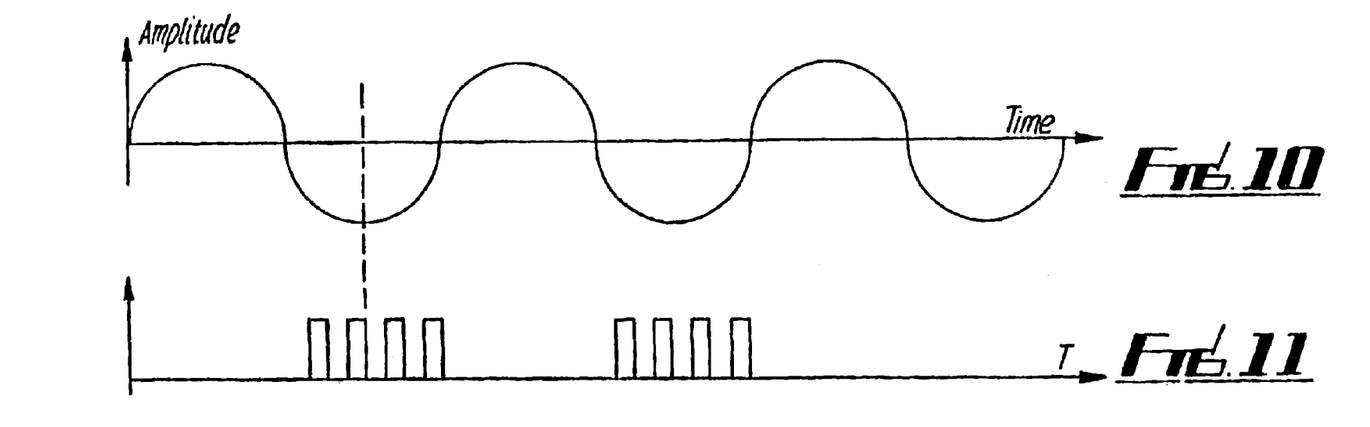
FIGS. 10-14 are waveforms illustrating further different parameters of the process for different modes of operation.

FIG. 10, like FIG. 4, shows the waveform for low frequency oscillation of the cathode (typically approximately 50 Hz).

FIG. 11, like FIG. 5, shows packages of current pulses which packages are locked so as to coincide in frequency and phase with the low frequency oscillations i.e. such that each package of current pulses is essentially centred on a negative peak of the low frequency oscillation corresponding to the smallest gap between the electrode and workpiece.

Figure 12:
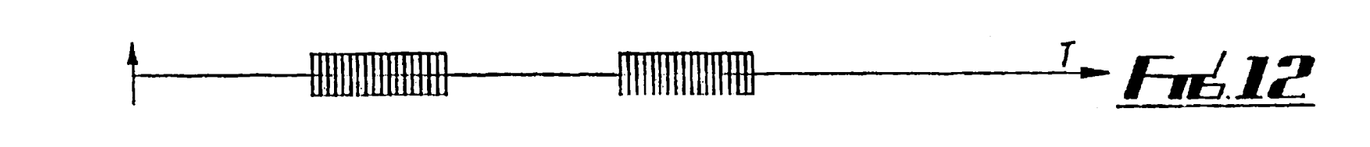
Figure 13:
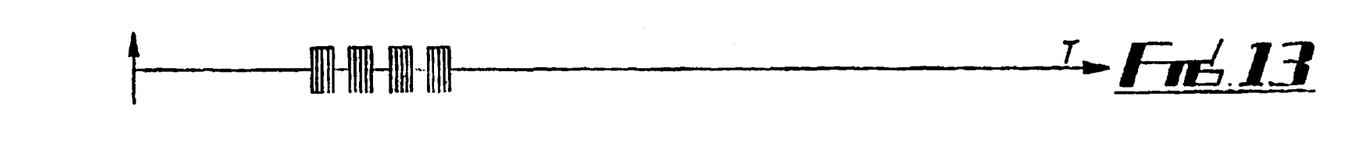
Figure 14:
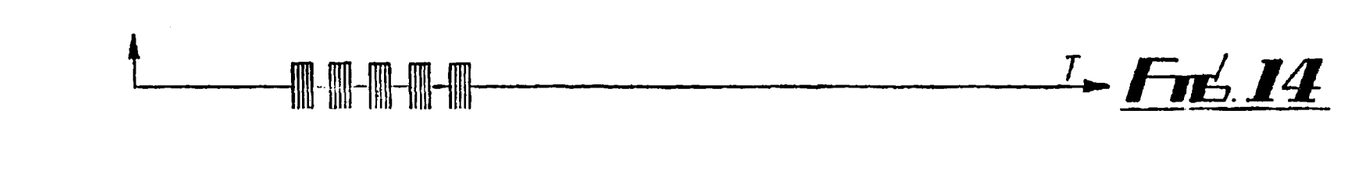

FIGS. 12-14, show three different possibilities for the high frequency (ultrasonic) oscillation. Instead of using a continuous ultrasonic vibration with constant amplitude envelope like FIG. 6, or an amplitude-modulated continuous ultrasonic vibration like FIGS. 7-9, the arrangements of FIGS. 12-14 show packages of ultrasonic vibration essentially centred on the negative peaks of the low frequency oscillations.

The processes described above permit accurate high quality machining with high rates of productivity. Good shaping and smoothness is readily achievable.

By way of example, with the mode of operation of FIG. 6, the spacing between the cathode and the workpiece can be reduced down to exceptionally small values, say of the order of 0.01 to 0.005 mm, which permits machining of very sharp definition at high current density, whilst the ultrasonic energy ensures removal of oxide film.

As mentioned, the ultrasonic energy also advantageously provides protection against damage by short circuit currents. When contact first takes place the duration of this will be no more than one half cycle of the ultrasonic frequency and this gives time for remedial action to be taken before damage has occurred.

Figure 15:
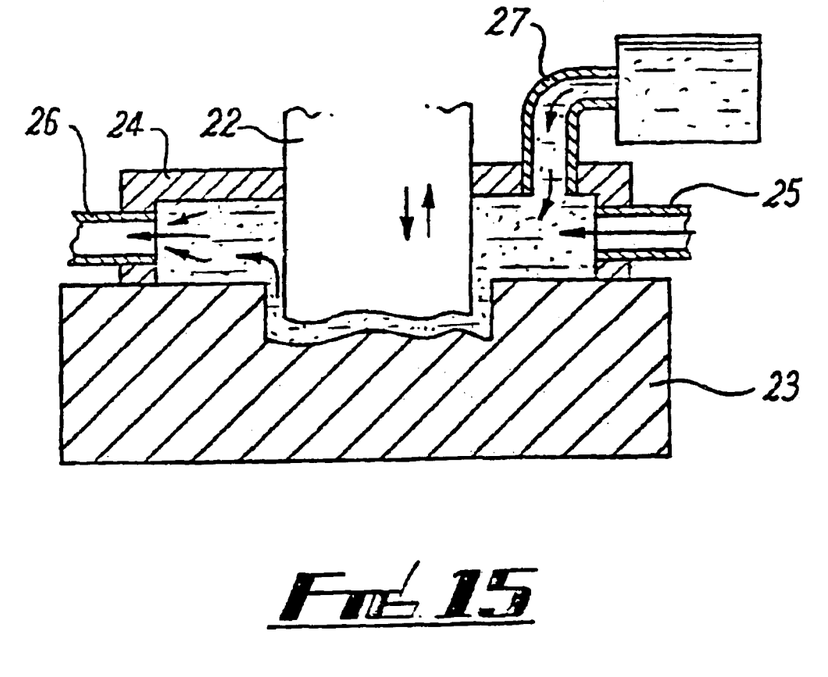
FIG. 15 is a diagrammatic view similar to FIGS. 1 and 2 showing a modification.

FIG. 15 shows a modification to the arrangement of FIGS. 1 and 2.

A shaped cathode 22 is moved relative to a workpiece 23, and is vibrated and supplied with current in like manner to the arrangement of FIGS. 1 and 2.

However, in order to improve the surface machining quality, reduce roughness, remove the oxide film and activate the electrochemical dissolution process, further features are incorporated as follows.

The cathode 22 and the surface of the workpiece 23 are, like the arrangement of FIGS. 1 and 2, enclosed within a vessel or shroud 24, and through this electrolyte can be pumped from an inlet 25 to an outlet 26.

An additional aqueous medium is injected through an auxiliary inlet 27 into the electrolyte flow immediately adjacent to the gap between the cathode and workpiece.

This additional medium may be a concentrated acid or alkali which significantly changes the pH of the electrolyte in the working area.

The additional medium may be an electrolyte with high concentration of anions to activate the electrochemical dissolution.

The additional medium may be a concentrated electrolyte (acid, alkali or salt solution) containing up to 30% of abrasive particles.

The combination of pulsed high power electric current and ultrasound with chemical and/or abrasive action can give desired machining in a short period of time.

The additional medium will depend on the workpiece material. Chemical and abrasive action is particularly effective for machining parts made from titanium alloys as well as parts from tungsten or tungsten carbide. Suitable acids are hydrochloric and sulphuric acid. Suitable alkalis particularly for machining tungsten are sodium and potassium hydroxide. Bromide, iodide, chloride, nitrate ions can be used as salt solution. Abrasive particles may be in the size range 5–50$\mu$.

It is of course to be understood that the invention is not intended to be restricted to the details of the above embodiment which are described by way of example only.

Thus, for example, whilst reference has been made throughout to movement of the cathode, where appropriate some or all of the movements may be applied additionally or alternatively to the workpiece.

What is claimed is:

1. An electrochemical machining technique wherein a cathode is advanced towards an anodic workpiece in the presence of an electrolyte and an electrical current is passed between the cathode and the workpiece through the electrolyte so as to cause material to be removed electrolytically from the surface of the material wherein vibratory movement is imposed on the cathode so as to cause the gap between the cathode and the workpiece to vary, and the electrical current is also varied wherein the vibratory movement imposed on the cathode comprises main and secondary vibrations.

2. The technique according to claim 1 characterised in that the virbratory movement comprises main and secondary vibrations.

3. The technique according to claim 1 characterised in that the main vibration is a periodic oscillation of 1 to 100 Hz.

4. The technique according to claim 3 characterised in that the periodic oscillation is a sine wave oscillation.

5. The technique according to claim 3 characterised in that the periodic oscillation is applied along the direction of advancement of the cathode towards the workpiece.

6. The technique according to claim 3 characterised in that the current is varied with a fixed phase relationship relative to the main vibration.

7. The technique according to claim 1 characterised in that the current is varied on a periodic basis matched to the main vibration.

8. The technique according to claim 1 characterised in that the current is varied at a frequency the same as that of the main vibration such that current peaks or pulses are delivered at or close to positions in the oscillatory cycle of the cathode corresponding to the smallest gap or nearest positioning of the cathode and workpiece.

9. The technique according to claim 1 characterised in that the secondary vibration is of a higher frequency that the main vibration.

10. The technique according to claim 1 characterised in that the secondary vibration is an ultrasonic oscillation.

11. The technique according to claim 10 characterised in that the ultrasonic oscillation has a frequency in the range 10–60 KHz.

12. The technique according to claim 1 characterised in that the secondary vibration is applied to the cathode simultaneously with the main vibration.

13. The technique according to claim 1 characterised in that the secondary vibration is applied along the direction of advancement of the cathode towards the workpiece.

14. The technique according to claim 1 characterised in that the secondary vibration is applied to the cathode continuously with constant regular characteristics.

15. The technique according to claim 1 characterised in that the secondary vibration is of varying characteristics.

16. The technique according to claim 1 characterised in that the secondary vibration is amplitude modulated.

17. The technique according to claim 1 characterised in that the secondary vibration is applied as packages of pulses.

18. The technique according to claim 1 characterised in that the secondary vibration is tuned to the cathode's mechanical properties to give resonance.

19. The technique according to claim 1 characterised in that a control system is provided which controls advancement of the cathode as material is removed from the workpiece surface so as to maintain a desired cathode/workpiece gap.

20. The technique according to claim 19 characterised in that the control system controls advancement in relation to a determined starting reference position so as to achieve a desired depth of machining in the workpiece.

21. The technique according to claim 1 characterised in that the electrolyte is caused to flow between the cathode and workpiece.

22. The technique according to claim 1 characterised in that the electrolyte is supplemented by addition of an aqueous medium containing at least one substance selected from acids, alkalis, abrasive particles and salts.

23. A machine assembly for use in performing electrochemical machining of a workpiece comprising a cathode support, a support for the workpiece, means for supplying an electrolyte between the cathode and workpiece, means for supplying an electrical current to the cathode and the workpiece, means for advancing the cathode towards the workpiece, means for applying vibratory movement comprising main and secondary vibrations to the cathode to vary the gap between the cathode and the workpiece, and means for varying the electrical current supplied to the cathode and the workpiece.

24. The machine assembly according to claim 23 characterised in that provision is made for movement in one or more axes transversely to the direction of advancement of the cathode optional further including means for rotation of the cathode about the direction of advancement.

25. An electrochemical machining technique wherein a cathode is advanced towards an anodic workpiece in the presence of an electrolyte and an electrical current is passed between the cathode and the workpiece through the electrolyte so as to cause material to be removed electrolytically from the surface of the material wherein vibratory movement is imposed on the cathode so as to cause the gap between the cathode and the workpiece to vary, and the electrical current is also varied on a periodic basis with a phase relationship to the vibratory movement, wherein the phase relationship is adjustable so as to lag or lead slightly the bottom-dead-centre position by a negative or positive phase value which can be preset.

26. The electrochemical machining technique according to claim 25 characterised in that the vibratory movement comprises main and secondary vibrations and the current is varied on a periodic basis matched to the main vibration.

27. The electrochemical machining technique according to claim 26 characterised in that the main vibration is a periodic oscillation of 1 to 100 Hz.

28. The electrochemical machining technique according to claim 27 characterised in that the periodic oscillation is a sine wave oscillation.

29. The electrochemical machining technique according to claim 27 characterised in that the periodic oscillation is applied along the direction of advancement of the cathode towards the workpiece.

30. The electrochemical machining technique according to claim 26 characterised in that the secondary vibration is of a higher frequency that the main vibration.

31. The electrochemical machining technique according to claim 26 characterised in that the secondary vibration is an ultrasonic oscillation.

32. The electrochemical machining technique according to claim 26 characterised in that the ultrasonic oscillation has a frequency in the range 10–60 KHz.

33. The electrochemical machining technique according to claim 26 characterised in that the secondary vibration is applied to the cathode simultaneously with the main vibration.

34. The electrochemical machining technique according to claim 26 characterised in that the secondary vibration is applied along the direction of advancement of the cathode towards the workpiece.

35. The electrochemical machining technique according to claim 26 characterised in that the secondary vibration is applied to the cathode continuously with constant regular characteristics.

36. The electrochemical machining technique according to claim 26 characterised in that the secondary vibration is of varying characteristics.

37. The electrochemical machining technique according to claim 26 characterised in that the secondary vibration is amplitude modulated.

38. The electrochemical machining technique according to claim 26 characterised in that the secondary vibration is applied as packages of pulses.

39. The electrochemical machining technique according to claim 26 characterised in that the secondary vibration is tuned to the cathode's mechanical properties to give resonance.

40. The electrochemical machining technique according to claim 26 characterised in that a control system is provided which controls advancement of the cathode as material is removed from the workpiece surface so as to maintain a desired cathode/workpiece gap.

41. The electrochemical machining technique according to claim 26 characterised in that the control system controls advancement in relation to a determined starting reference position so as to achieve a desired depth of machining in the workpiece.

42. The electrochemical machining technique according to claim 26 characterised in that the electrolyte is caused to flow between the cathode and workpiece.

43. The electrochemical machining technique according to claim 26 characterised in that the electrolyte is supplemented by addition of an aqueous medium containing at least one substance selected from acids, alkalis, abrasive particles and salts.

44. The electrochemical machining technique according to claim 25 characterised in that the current is varied at a frequency the same as that of the main vibration wherein peaks or pulses are delivered at or close to positions in the oscillatory cycle of the cathode corresponding to the smallest gap or nearest position of the cathode and workpiece.

45. A machine assembly for use in performing electrochemical machining of a workpiece comprising a cathode support, a support for the workpiece, means for supplying an electrolyte between the cathode and workpiece, means for supplying an electrical current to the cathode and the workpiece, means for advancing the cathode towards the workpiece, means for applying vibratory movement to the cathode to vary the gap between the cathode and the workpiece, and means for varying the electrical current supplied to the cathode and the workpiece on a periodic basis with a phase relationship to the vibratory movement, wherein the phase relationship is adjustable so as to lag or lead slightly the bottom-dead-centre position by a negative or positive phase value which can be preset.

46. The assembly according to claim 45 characterised in that provision is made for movement in one or more axes transversely to the direction of advancement of the cathode optional further including means for rotation of the cathode about the direction of advancement.

47. The machine assembly according to claim 45 characterised in that the means for applying vibratory movement comprises main and secondary vibrations.

48. The machine assembly according to claim 47 characterised in that the current is varied at a frequency the same as that of the main vibrations such that current peaks or pulses are delivered at or close to positions in the oscillatory cycle of the cathode corresponding to the smallest gap or nearest positioning of the cathode and workpiece.

* * * * *